No. 742,766. PATENTED OCT. 27, 1903.
R. F. WELLS.
SHEEP SHEARS.
APPLICATION FILED SEPT. 10, 1902.
NO MODEL.

Witnesses
Inventor
Robert F. Wells
by his attorneys

No. 742,766.

Patented October 27, 1903.

UNITED STATES PATENT OFFICE.

ROBERT FEATHERSTONE WELLS, OF MELBOURNE, VICTORIA, AUSTRALIA.

SHEEP-SHEARS.

SPECIFICATION forming part of Letters Patent No. 742,766, dated October 27, 1903.

Application filed September 10, 1902. Serial No. 122,795. (No model.)

*To all whom it may concern:*

Be it known that I, ROBERT FEATHERSTONE WELLS, a subject of the King of Great Britain, residing at No. 82 William street, Melbourne, in the State of Victoria, Australia, have invented certain new and useful Improvements in Sheep-Shears, of which the following is a specification.

In hand sheep-shears commonly in use the spring is usually too powerful and the blades in operation come apart. I provide means for limiting the outward movement of the blades, so as to prevent this coming apart, technically known as "overlapping." The special advantage of the invention is that the strain of keeping the blades within their proper limits is taken from the hand of the operator, and the operation of shearing thus becomes much easier, as the strain on the hand working the shears is practically released at intervals instead of being continuously borne by the operator, and, furthermore, the risk of cutting the shearer's thumb when overlapping occurs is obviated.

In order that the invention may be the more easily understood, I will now describe same with reference to the accompanying sheet of drawings, in which—

Figures 1, 2, 3:
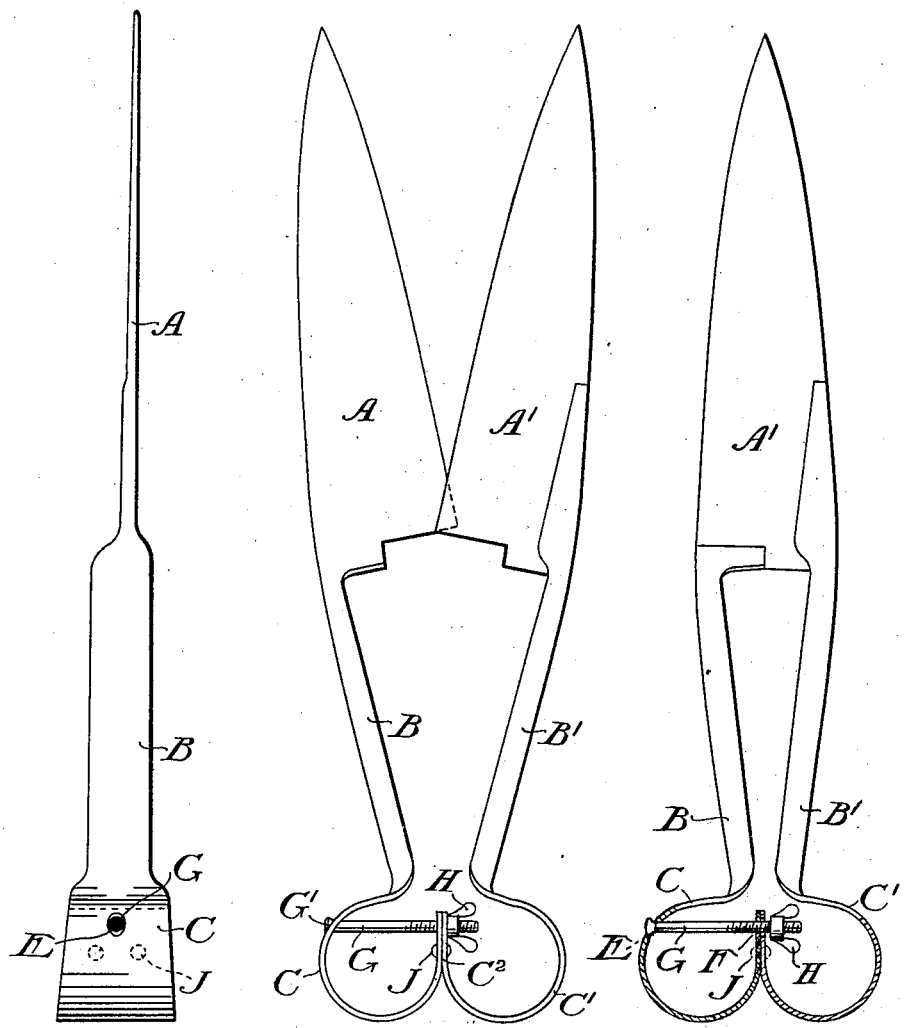
Figure 4:
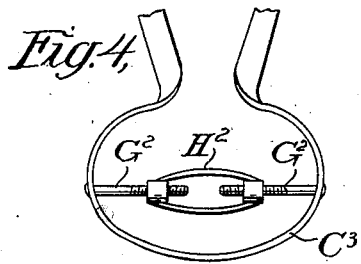
Figure 5:
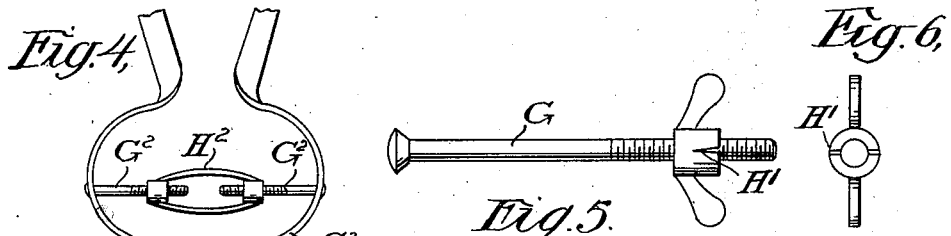
Figure 6:
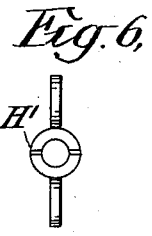

Figure 1 shows a side elevation of one form of my shears with head of the bolt removed. Fig. 2 shows a front elevation of the same, showing the shears in their open position. Fig. 3 shows a view corresponding with Fig. 2, but with the shears closed. Fig. 4 shows my invention applied to shears in which the spring-bow is formed in one piece. Fig. 5 shows a side view of a bolt and nut preferably employed detached. Fig. 6 shows an end view of the same.

A A' represent the blades, B B' the handles, and C C' the bow portions, of the shears, the double bows C C' being commonly secured together by rivets J through upwardly-extending portions C². I provide one of the bows with a hole E, preferably of oval form, and in line with same through the extensions C² is also formed a circular hole F. A bolt G passes through the said holes. This bolt is screw-threaded and has a head G' at its end by which it is held, and a nut H screws onto the end of the bolt, by means of which the spring can be so adjusted as to limit the outward or expansive movement of the handles and blades. (See Fig. 2.) The nut H may be of any suitable form. I have shown a wing-nut on the drawings; but it might be found advisable to employ an ordinary nut and with it a lock-nut, or I may employ a special form of winged nut (see Figs. 5 and 6) having cuts H' in it, so as to allow it to be pinched to slightly reduce its internal diameter at that part, and thus cause it to more permanently grip the bolt and not be so much affected with the vibration of the shears when working.

In operating with the shears as the blades are forced together the distance between the outer edge of the bow where the bolt passes through it and the extension C² becomes reduced, so that when the shears are closed the pressure of the nut H will be reduced from the said extension, and on releasing the pressure the spring of the bow will cause the blades to move outwardly until the old position is assumed—that is to say, with the bow bearing against the bolt-head and the extension C² bearing against the nut H.

In applying the invention to shears that have the bow formed in one piece the above-described arrangement is somewhat modified—that is to say, the bow C³, Fig. 4, has a hole at each side, and into each said hole is put a short bolt G², one of which is provided with a right-hand screw and the other a left-hand screw. These bolts are held by thumb-nut H², by means of which the bolts can be drawn nearer together, so as to adjust the position of same to limit, as before, the outward travel or expansion of the handles and blades.

I do not confine myself arbitrarily to the details of construction herein described, and illustrated on the accompanying drawings, as these may be varied or modified without departing from the spirit of the invention.

Having now particularly described and ascertained the nature of my said invention and in what manner the same is to be performed, I declare that what I claim is—

1. In sheep-shears, means for limiting the expansion or outward travel of the handles and blades comprising a headed screw-bolt set between a bow and its central extension, and a nut upon same substantially as and for the purposes described.

2. In sheep-shears, means for limiting the expansion or outward travel of the handles and blades comprising in combination bow $C^3$ with holes, bolts $G^2$ and a loop-nut $H^2$ uniting the said bolts substantially as and for the purposes described.

In testimony whereof I have signed my name to this specification in the presence of two subscribing witnesses.

ROBERT FEATHERSTONE WELLS.

Witnesses:
C. W. WADE,
A. HARKER.